United States Patent [19]

Das

[11] Patent Number: 4,885,649
[45] Date of Patent: Dec. 5, 1989

[54] THIN FILM HEAD HAVING A MAGNETO-RESTRICTIVE READ ELEMENT

[75] Inventor: Shyam C. Das, Acton, Mass.

[73] Assignee: Digital Equipment Corporation, Maynard, Mass.

[21] Appl. No.: 253,390

[22] Filed: Oct. 4, 1988

Related U.S. Application Data

[63] Continuation of Ser. No. 33,446, Apr. 1, 1987, abandoned.

[51] Int. Cl.$^4$ .......................... G11B 5/17; G11B 5/31; G11B 5/39
[52] U.S. Cl. .................................... 360/113; 360/123; 360/126
[58] Field of Search ............... 360/113, 119, 122, 123, 360/125, 126

[56] References Cited

U.S. PATENT DOCUMENTS

| | | | |
|---|---|---|---|
| 3,908,194 | 9/1975 | Romankin | 360/113 |
| 3,921,217 | 11/1975 | Thompson | 360/113 |
| 4,150,408 | 4/1979 | Koel et al. | 360/113 |
| 4,164,770 | 8/1979 | Jeffers | 360/113 |
| 4,255,772 | 3/1981 | Perez | 360/113 |
| 4,300,177 | 11/1981 | Koel et al. | 360/113 |
| 4,523,243 | 6/1985 | Billington | 360/113 |
| 4,535,375 | 8/1985 | Mowry et al. | 360/113 |
| 4,668,913 | 5/1987 | Vinal | 360/113 |
| 4,683,508 | 7/1987 | Jeffers et al. | 360/113 |
| 4,698,711 | 10/1987 | Vinal | 360/113 |
| 4,775,354 | 6/1988 | Jeffers | 360/113 |

FOREIGN PATENT DOCUMENTS 0037967 10/1981 European Pat. Off. .
0154005 9/1985 European Pat. Off. .
61-48116 3/1986 Japan .

OTHER PUBLICATIONS

Patent Abstracts of Japan, vol. 10, No. 210 (P-479) (2266) 23 Jul. 1986, & JP, A, 6148116 (Fujitsu Ltd) 8 Mar. 1986.
F. J. Jeffers: "Magnetoresistive Transducer with Canted Easy Axis," I.E.E.E. Transactions on Magnetics, vol. MAG-15, No. 6, Nov. 1979, (New York, US), pp. 1628-1630.
Patent Abstracts of Japan, vol. 6, No. 51 (P-108) (929) 6 Apr. 1982 & JP, A, 56165925 (Mitsubishi Denki K.K.) 19 Dec. 1981.
Patent Abstracts of Japan, vol. 7, No. 212, (P-224) (1357) 20 Sep. 1983, & JP, A, 58108025 (Nippon Victor K.K.) 28 Jun. 1983.
Patent Abstracts of Japan, vol. 7, No. 216 (P-225) (1361) 24 Sep. 1983, & JP, A, 58111114 (Fujitsu K.K.) 2 Jul. 1983.
IEEE Transactions on Magnetics, vol. Mag-17, No. 6, Nov. 1981, pp. 2884-2889.

Primary Examiner—Robert S. Tupper
Attorney, Agent, or Firm—Fish & Richardson

[57] ABSTRACT

A read/write head for use in a magnetic storage device in a digital data processing system for writing data in the form of magnetic flux onto, and reading data from a spinning magnetic disk. The head has two magnetic pole pieces each with a yoke region which tapers to a pole tip and an energizable coil situated between the pole pieces in the yoke region for generating magnetic flux. One of the pole pieces has a slot in the yoke region, and a strip of magneto-resistive material is situated adjacent the slot. The magneto-resistive strip is adapted to be connected to sensing equipment which measures variations in the resistance of the magneto-resistive strip in response to the variations in the magnetic flux recorded on the media. Several slots may be formed in the pole pieces, and an elongated magneto-resistive strip may be situated adjacent the slots.

19 Claims, 3 Drawing Sheets

THIN FILM HEAD HAVING A MAGNETO-RESTRICTIVE READ ELEMENT

This is a continuation of co-pending application Ser. No. 033,446 filed on Apr. 1, 1987 now abandoned.

BACKGROUND OF THE INVENTION

1. Field of the Invention

The invention relates generally to the field of magnetic data storage devices, and particularly to read/write heads for use in such devices. The invention particularly provides a new magneto-resistive thin film head for use in disk data storage devices for use in digital data processing systems.

2. Description of the Prior Art

A typical modern digital data processing system comprises a hierarchy of memory devices, including a semiconductor main memory of relatively small capacity, and one or more mass storage devices, which have a much greater capacity than the main memory, but which are also relatively much slower. The mass storage devices provide a back-up store for data which is in the main memory, and also for the voluminous amounts of data which will not fit into the main memory, but which can be called upon by the processor when it is needed. A processor typically only obtains information directly from the main memory, and so, when it needs information which at the moment is only in a mass storage device, it enables the mass storage device to copy the information into the main memory. Some time later, after it has processed the information, the processor enables the processed information to be stored in the mass storage device. This frees up storage in the main memory so that other information may be stored there.

Typical mass storage devices store information on spinning magnetic disks, the information being recorded in the form of transitions in magnetic flux on the magnetic surface of the disk. In particular, the data is recorded in a plurality of tracks, with each track being a selected radial distance from the center of the disk. A read/write head flies in close proximity to the disk surface and is held in the appropriate radial position over the disk by an arm. Under the control of the system's processor unit the arm can move the read/write head to the appropriate track in which the data is recorded so that it may be read, or into which the data is to be written.

A read/write head comprises two pole pieces formed from a magnetic material and a wire coil. At one end, the pole pieces are touching and at the other end there is a slight gap between the pole pieces The head is positioned so that the gap is directed towards the disk surface. When electric current is impressed on the coil, a magnetic flux is generated, which is impressed upon the pole pieces. At the gap, the magnetic flux is directed through the magnetic material in the adjacent disk surface to thereby impress magnetic flux therein.

When data is being written onto a disk, the coil is energized with a varying voltage pattern which corresponds to the data to be written. The varying voltage results in the generation of a corresponding pattern in the magnetic flux which the head applies to the surface of the rotating disk. Since the disk moves relative to the head, the magnetic flux on the disk surface also varies along the length of the arc traversed by the head on the disk.

When the data is read, the head flies over the arc of the disk surface in which the data was written. A small amount of flux from the disk permeates the head. The flux in the head varies in response to the pattern of flux recorded on the disk. The varying flux results in the generation of a varying voltage in the coil, which, in turn, is sensed as the previously-recorded data.

One problem with a conventional read/write head is that the variation in the voltage induced in the coil does not directly follow the actual flux, but instead follows the rate of change of the flux as the disk rotates adjacent the head. It is therefore evident that reading of data with conventional heads is sensitive to the speed of the disk relative to the head, that is, the speed of rotation of the disk.

Recently read/write heads have been developed which include a strip of magneto-resistive material, such as a nickel iron alloy. One such alloy is commercially known as "Permalloy". The strip is positioned in the gap between the pole pieces that are adjacent the disk. In such heads, the electrical resistance of the magneto-resistive material is related to an applied magnetic field. As flux from the disk permeates the head while it flies over the disk surface, the flux is applied to the magneto-resistive material. Thus, the resistance of the magneto-resistive material varies in response to the variations in the flux in the head, which in turn reflects the variations in the flux on the disk. The resistance of the magneto-resistive strip is sensed by conventional sensing circuits to provide a signal that is related to the recorded flux. Thus, unlike the conventional read/write heads, the voltage signals from such read/write heads, specifically from the magneto-resistive strip, are not sensitive to the speed of the disk.

In a head having a magneto-resistive strip, the strip is formed so as to have a magnetization along the length of the strip; that is, the magnetic dipoles in the strip are aligned parallel to the strip's longitudinal axis. A current is applied longitudinally to the strip. A graph of the resistance of the strip to electric current, in relation to the direction of the strip's magnetic dipoles, is a bell-shaped curve. For example, if the strip is a nickel iron alloy, if no external flux is applied to the head, the resistance exhibited by the strip to current applied in a longitudinal direction through the strip (which is parallel to the magnetization) will be at a maximum. If, however, external magnetic flux is applied to the strip which forces the strip's magnetic dipoles into an orientation perpendicular to the length of the strip, the strip's resistance to the applied current will be at a minimum.

Otherwise stated, continuing with the same example, if the current flow is parallel to the magnetization of the strip, the resistance of the strip is at a maximum, but if the current flow is orthogonal to the magnetization, the resistance is at a minimum. Intermediate these two extremes, that is, with the strip's magnetic dipoles aligned approximately forty-five degrees with the direction of the applied current, the change in resistance of the strip with respect to the applied magnetic field is approximately linear. It will be appreciated that the alignment of the strip's magnetic dipoles is related to the applied magnetic flux, and thus the resistance of the strip will be related to the direction and amount of applied magnetic flux.

There are two problems with heads using magneto-resistive strips as read elements. One problem is that the magneto-resistive strip requires external biasing to force it into the linear region so that the resistance changes as an approximately linear function of the applied flux. If a magneto-resistive strip is not biased, a small applied flux from a disk will be unable to change the orientation of the strip's magnetic dipoles sufficiently to provide a large enough change in the resistance of the strip. The same will occur if the strip is biased too much, so that the magnetic dipoles are perpendicular to the strip's longitudinal direction. In either case, the strip will have a very low sensitivity to the applied flux level.

U.S. Pat. No. 4,535,375, issued to G. Mowry, et al., on Aug. 13, 1985, entitled Magneto-resistive Head, discloses a head with a complex magneto-resistive read element. The magneto-resistive element disclosed in that patent includes an elongated magneto-resistive strip and plurality of equipotential strips disposed along the element at a skewed angle (generally, approximately forty-five degrees) with respect to the elements longitudinal axis. A bias current is applied and the equipotential strips force the current to flow generally orthogonal to the strips. This bias current generates a bias field which orients the magneto-resistive strip's magnetic dipoles at a forty-five degree angle with respect to the current.

Another problem with magneto-resistive elements is a result of the tendency of an element, which was originally magnetized in a single magnetic domain (that is, a region in which all of the magnetic dipoles are oriented in a common direction), to develop a plurality of separate magnetic domains. One cause of formation of multiple domains is end effects, that is the perturbation of the dipoles at the ends of the strip, which are usually not precisely aligned with the longitudinal axis because of spreading typical at the end of a magnetic member. Over time, the effect may spread throughout the strip, resulting in multiple magnetic domains throughout the strip.

Another source of multiple domains in magneto-resistive strips arises from the fact that, during writing, the head, including the magneto-resistive strip, is saturated with magnetic flux (hereafter "write flux"). This write flux is perpendicular to the longitudinal direction of the strip, and the magnetic dipoles in the strip tend to align with the applied write flux. After the write operation is completed, the strip's magnetic dipoles return to an orientation along the strip's longitudinal axis, but they need not return to their former orientations. They may instead be aligned in the opposite direction. As this repeatedly occurs following write operations, a number of domains develop with differing orientations of magnetic dipoles. Thus, multiple domains may be created throughout the strips, not just at the ends.

A result of the development of the multiple magnetic domains is Barkhausen noise, which is noise in the voltage signal will be noisy due to sudden jumps in the magnetization of the strip The magneto-resistive element disclosed in the aforementioned U.S. Pat. No. 4,535,375 proposes to minimize Barkhausen noise by providing a very long magneto-resistive strip and sensing the change in resistivity across only a small portion of its length. This can help with minimizing the Barkhausen noise due to end effects, but it does not significantly reduce the noise due to the creation of multiple domains along the strip caused by the write flux applied to the strip. Furthermore, the length of the magneto-resistive element disclosed in the patent and the placement of the element adjacent the disk in the pole tip combine to effectively limit the inter-track spacing, as the tracks must be far enough apart so that, while the element is positioned over one track, it does not receive interfering flux from an adjacent track.

SUMMARY OF THE INVENTION

The invention provides a new and improved read/write head for a disk subsystem for use in a digital data processing system in which a magneto-resistive material is provided for reading purposes, which minimizes Barkhausen noise while facilitating increased track density.

In brief, the invention provides a read/write head for use in a digital data processing system including a pair of pole pieces having an enlarged yoke portion which tapers to a narrow pole tip. A coil is disposed in the yoke portion to generate magnetic flux during writing, the pole pieces directing the magnetic flux to the pole tip. A slot is formed in the yoke portion of one of the pole pieces and an elongated strip of magneto-resistive material is situated adjacent the slot to be used during reading operations. The pole tip of the pole pieces senses the magnetic flux from the disk and the pole pieces direct the flux to the magneto-resistive strip. During reading, the coil is energized to provide a biasing field in the magneto-resistive strip. A coil is provided adjacent the strip to provide a magnetic field along the strip at the end of or immediately after write operations to ensure that the strip remains a single magnetic domain.

In a second embodiment, each of the pole pieces has a slot formed in their respective yoke portions, and a single magneto-resistive strip is formed around the slots in the shape of a U. The U-shaped strip effectively forms a horseshoe magnet which is more impervious to formation of multiple magnetic domains during write operations than is a unidirectional magneto-resistive strip.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 1C-1 and 1C-2 depict a front and end detail view, respectively of an alternate pole tip for the head depicted in FIG. 1A; and FIG. 2A depicts a top view of a second read/write head constructed in accordance with the invention and FIG. 2B depicts a cross sectional view of the head depicted in FIG. 2A.

DETAILED DESCRIPTION OF AN ILLUSTRATIVE EMBODIMENT

Figure 1A:
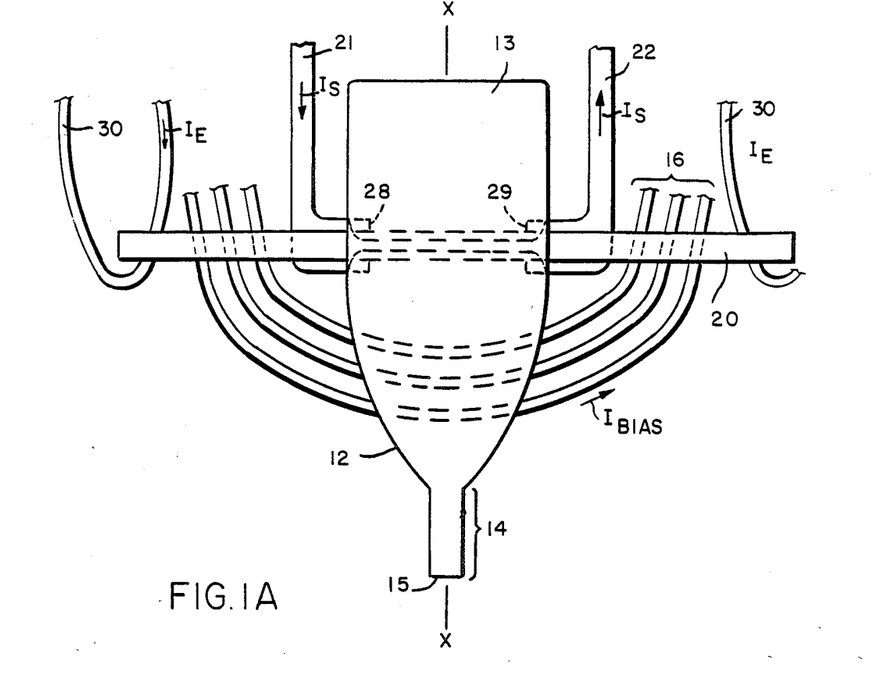
FIG. 1A depicts a top view of a new read/write head constructed in accordance with the invention and FIG. 1B depicts a cross sectional view of the head depicted in FIG. 1A taken along axis X—X.
Figure 1B:
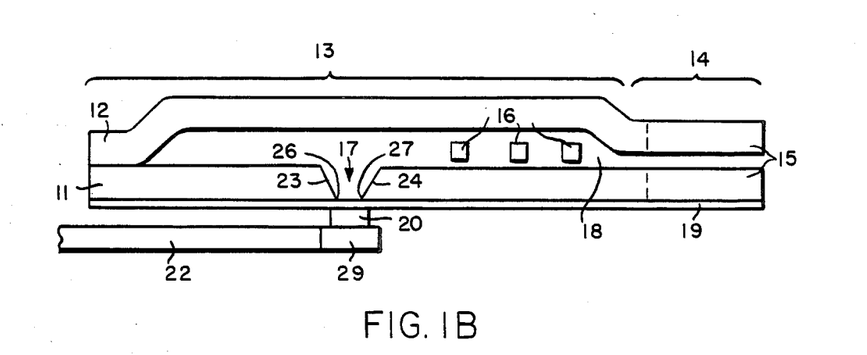

With reference to FIGS. 1A and 1B, a new read/write head 10 constructed in accordance with the invention includes two pole pieces 11 and 12 formed of a magnetic material separated by a layer 18 of insulation such as a hard-baked photoresist. Each pole piece defines a relatively large yoke region 13 which tapers to a pole tip 14 having an end 15. In operation, the head is suspended from an arm (not shown) so that the end 15 is generally directed toward the surface of a spinning disk (not shown) which has a magnetic media thereon, and the far end of the yoke region 13 (to the left as shown in FIG. 1B) will be distal from the disk surface. The head has an axis indicated by the legend X—X and the arm holds the head so that the axis X—X is generally orthogonal to the disk surface.

Head 10 also includes a multiple-turn planar helical coil 16 (a portion of which is depicted in FIG. 1A) positioned between the pole pieces 11 and 12 in the yoke region to generate magnetic flux for writing data onto the disk as described below. At the left end of the yoke region 13, the pole pieces 11 and 12 touch so as to encircle a portion of the coil to provide a complete path of magnetic material between the pole pieces in the yoke region 13. Otherwise, a separation is maintained between the pole pieces in both the yoke region 13 and the pole tip 14. In the yoke region, the separation between the pole pieces 11 and 12 may be relatively large, to allow the pole pieces to accommodate the coil 16 and ensure that there is minimal flux leakage between the pole pieces. In the pole tip, however, the separation between the pole pieces is relatively small.

In accordance with one aspect of the invention a slot 17 is formed in yoke region 13 of one pole piece in an orientation which is generally parallel to the expected orientation of the disk surface. That is, the orientation of the slot 17 is generally orthogonal to axis X—X. In the embodiment depicted in FIG. 1, the slot is formed in pole piece 11. Adjacent the slot, a strip 20 of magneto-resistive material, such as a nickel iron alloy (such as "Permalloy"), is positioned, electrically insulated from the pole piece 11 by a thin, non-magnetic insulator such as alumina or silicon dioxide The strip is formed so as to have a single magnetic domain with its magnetic dipoles situated parallel to the strip's longitudinal axis, that is perpendicular to the axis X—X. The ends of the magneto-resistive strip 20 are connected to electrodes 21 and 22 which are also connected to sensing circuits (not shown) whose operation will be described below. Preferably the walls 23 and 24 defining slot 17 are not disposed orthogonally to strip 20, but instead are slanted at an acute angle with respect to the strip 20 so as to form pointed edges 26 and 27 adjacent the strip 20, as is shown in FIG. 1B.

As described above, the coil 16 is used during a writing operation, in which magnetic signals representing digital data are impressed in the magnetic media comprising the disk surface. During a writing operation, an electrical signal representing the digital data is applied to the coil 6. The electrical signal applied to coil 16 varies to define the digital data to be recorded in a known manner. In response to the electrical signal, the coil generates magnetic flux in the pole pieces. Assuming that, at one instance, the electrical signal is conditioned to enable the coil to generate magnetic flux upwardly (as shown in FIG. 1B) and forwardly (as shown in the FIG. 1A), that is, in the direction toward pole piece 12, the magnetic flux is first received in pole piece 12 in the yoke region 13. The flux travels in pole piece 12 through the yoke region toward the pole tip. Because the pole tip has a smaller cross-sectional area than the yoke region, the flux is concentrated in the gap; that is, the amount of flux per unit area in the gap is greater than in the yoke region. At the end 15 of pole piece 12, the flux exits the pole piece and goes through the magnetic surface of the disk thereby impressing the magnetic flux in the magnetic media that is then adjacent the gap.

The flux returns from the disk through end 15 of pole piece 11. From there, it goes through the pole tip of pole piece 11 to the pole piece's yoke region. The larger yoke region permits the flux to spread out. At slot 17, the pointed edge 26 adjacent the magneto-resistive strip 20 concentrates the flux and directs it through the strip 20, which conducts it to edge 27. Edge 27 receives the flux from magneto-resistive strip 20 and directs it to the distal end of the yoke region 13 of pole piece 11. Since the flux during a write operation is generally very large, the magneto-resistive strip essentially saturates and largely acts as an air gap across the slot 17.

It will also be appreciated that, if at some instances the magnetic flux generated by coil 16 has the opposite direction from that described above, the path of the flux through the pole pieces and disk's magnetic media is also reversed. Thus, the pole pieces 11 and 12, the disk magnetic media and strip 20 form a complete magnetic circuit for the flux generated by coil 16 during a writing operation. In addition, with the disk spinning under the head, the arm (not shown) maintaining the head over one track on the disk, the varying magnetic flux generated by head 10 in response to the variations in the digital data is applied to the magnetic media along the track. Accordingly, the flux changes representative of the digital data are impressed along the track on the disk.

In accordance with another aspect of the invention, while, or immediately after, the data is written, a current $I_E$ is applied to wires 30 positioned underneath the ends of the magneto-resistive strip 20. The current applied to the wires 30 establishes a small magnetic field in the magneto-resistive strip 20, which enables the magnetic dipoles in the strip, which during the writing operation had been in an orientation parallel to the axis X—X (that is, orthogonal to the longitudinal axis of the strip 20) to orient themselves in one direction along the longitudinal axis. In effect, the write flux through the magneto-resistive strip 20 forces the strip's dipoles in an orientation orthogonal to the longitudinal direction. When the write flux is removed, the dipoles may return to a longitudinal orientation, but in either direction. The magnetic field applied by the wires 30 enables the dipoles to return to a selected direction, which is determined by the field generated by the wires. Accordingly, the wires 30, and application of current thereto after the writing operation, maintain the magneto-resistive strip in a single magnetic domain.

After data has been written, it may be read by positioning the read/write head 10 over the disk track on which the data has been written. During a reading operation, a constant current $I_{bias}$ is applied to the coil 16. As a result of this current, a constant magnetic flux is generated, which is applied to the pole pieces 11 and 12, and, accordingly, to magneto-resistive strip 20. This flux is a bias flux in the magneto-resistive strip 20. The current which generates the reference flux is high enough to generate sufficient flux to be used as a biasing flux, but is small enough that the flux does not interfere with the data which has been recorded on the disk.

As the disk moves adjacent the end 15, the transitions in the flux recorded on the disk provides magnetic flux which permeates the pole pieces 11 and 12 through end 15 of the pole tip 14. The magneto-resistive strip 20 essentially senses the flux in the pole piece 11 in which it is situated. The flux permeating the other pole piece 12 has little effect on strip 20. It will be appreciated that the edges 26 and 27 in pole piece 11, which are defined by the respective walls 23 and 24 positioned at acute angles, ensure that the flux is efficiently conducted to and through the magneto-resistive strip 20 and to reduce fringing edge effects of the magnetic flux at the walls 23 and 24 which might cause at least some of the flux to bypass some or all of magneto-resistive strip 20.

Sensing equipment (not shown) applies a current $I_s$ between the electrodes 21 and 22, and detects changes in the voltage due to the field from the transitions. The changes in the voltage sensed by the sensing equipment are directly related to the changes in resistance of the magneto-resistive strip 20, and specifically the changes in the resistance of the portion of the strip between end faces 28 and 29 of the electrodes 21 and 22. Thus, as the disk passes under end 15 of head 10, the changes in the voltage level, relative to the voltage level resulting from only the bias flux from coil 16 are directly related to the changes in the resistance of the magneto-resistive material, and, accordingly, the change in the flux pattern on the disk.

It will be appreciated that two factors limit the density with which data can be recorded on the disk, namely, the number of tracks which can be recorded per unit of radius of the disk, and the number of flux transitions which may be recorded per length of track. The number of tracks per unit of radius is, in turn, related to the width of the pole pieces 11 and 12 at the end 15. Thus, the wider the pole pieces at end 15, the fewer the number of tracks which may be recorded per unit of radius.

The number of flux transitions which may be recorded per length of track is related to several factors, including the width of the gap, that is the distance between pole pieces at end 15. It will be appreciated that the larger the gap width, the less data may be recorded on a track.

The arrangement depicted in the FIGS. 1A and 1B permits both the width of the pole pieces at end 15 and the gap width to be minimized, thus enhancing the density of data which may be recorded, while using a magneto-resistive strip 20 of sufficient length to minimize the effects of the Barkhausen noise due to creation of multiple magnetic domains at the ends of the magneto-resistive strip 20. In prior heads in which the magneto-resistive strip was placed in the gap, the gap had to be of greater width to accommodate the strip. In addition, in the head described in the aforementioned U.S. Pat. No. 4,535,375, the head is relatively long to minimize the Barkhausen noise, but the length is constrained by the desired track density.

By removing the magneto-resistive strip 20 from the pole tip 14 and placing it in the yoke region 13, both the width of the pole pieces and the width of the gap at end 15 may be made smaller. Since the width of the pole pieces in the yoke region 13 is much larger than width in the pole tip, the magneto-resistive strip 20 may be made longer, thus minimizing the Barkausen noise due to end effects. The coil 30 further reduces Barkhausen noise in the other portions of the strip 20 by urging the magnetic dipoles in a common direction following writing operations.

In addition, since the width of the pole pieces 11 and 12 in the yoke region 13 of the new read/write head is independent of the track density, the length of the magneto-resistive strip between the ends 28 and 29 of the electrodes 21 and 22 is also independent of the track density, the sensitivity during reading is also independent of the track density. If the portion of the magneto-resistive strip 20 between the sensing electrodes 21 and 22 is short, as is the case when the strip is in the gap in the pole tip region, the resistance of the strip and the change in resistance during reading are both low, and so the sensitivity of the strip is also low. However, since the strip 20 in the new head is in the yoke region 13, the portion of the strip between the electrodes 21 and 22 is relatively long, permitting a higher sensitivity. Since the width of the yoke is independent of the track density, the sensitivity of the new head is also independent of the track density.

Figure 1C:
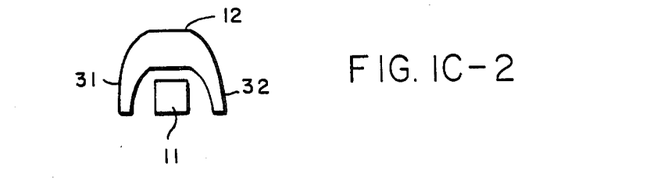
Figures 1C, 2A:
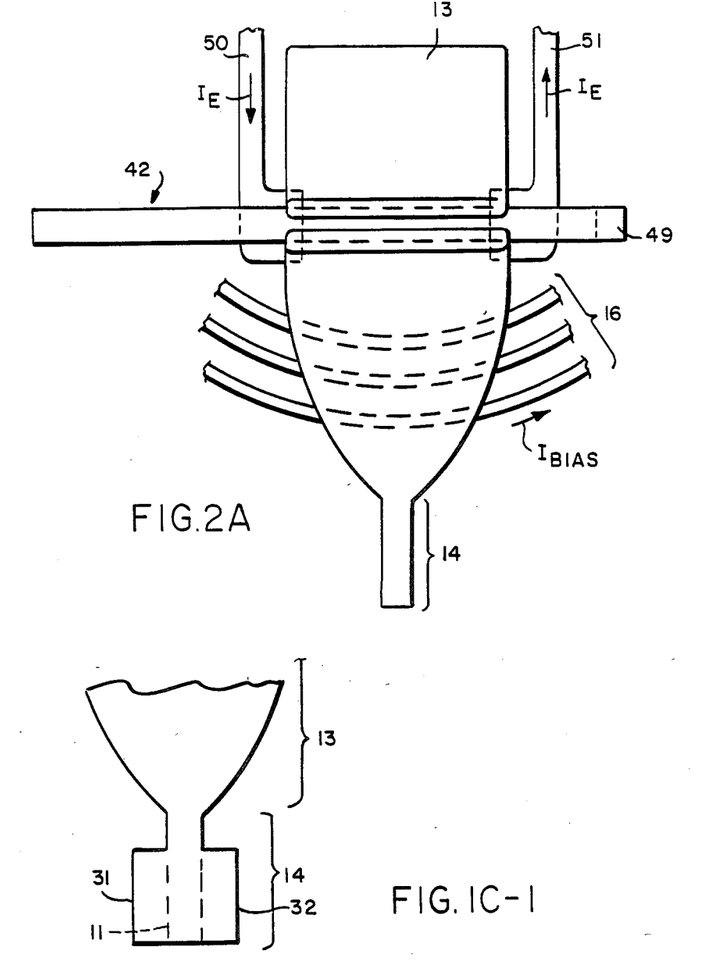

FIG. 1C-1 and 1C-2 depict a detail of a modification of the pole tip region 14 to provide side shields 31 and 32. The side shields 31 and 32 are attached to and form part of the pole tip portion 14 of pole piece 12, and depend along the side of the pole tip portion 14 of pole piece 11. The side shields 31 and 32 may be formed from the same magnetic material comprising the pole pieces 11 and 12.

In operation, the side shields 31 and 32 shield the pole tip portion 14 of pole piece 11 from fringing flux from adjacent tracks during a reading operation. The fringing flux from adjacent tracks can permeate the pole piece in the same manner as flux from the track the head 10 is reading and can result in noise in the signal obtained by the sensing equipment (not shown) that is connected to the head. Since, as described above, the output from the magneto-resistive strip 20 relates to the magnetic flux permeating pole piece 11 and is substantially unrelated to the flux permeating pole piece 12, with the side shields 31 and 32 the magneto-resistive strip is not effected by the fringing flux from the adjacent tracks Thus, by shielding the head from the fringing flux, the side shields 31 and 32 can improve the signal-to-noise ratio and permit closer spacing between tracks.

Figure 2B:
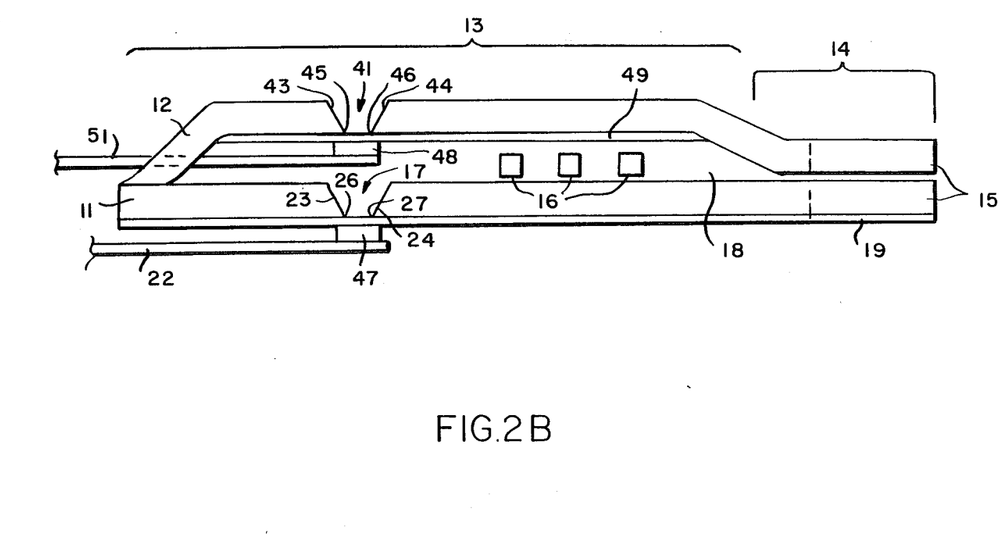

FIG. 2 depicts another read/write head 40 which is similar to head 10 (FIG. 1), with the addition of a slot 41 in the yoke region 13 of pole piece 12 and the positioning of a portion of a magneto-resistive strip 42 therein, separated from pole piece 12 by an insulating layer 49, which is similar to insulating layer 19. Elements of head 40 which are similar to the elements of head 10 have common reference numerals. Like slot 17, slot 41 includes surfaces 43 and 44 situated at acute angles with respect to the pole piece 12 so as to form edges 45 and 46 adjacent the strip 42. Strip 42 is generally in the shape of a U, with portions 47 and 48 being adjacent the slots 17 and 41, respectively, and a connecting portion 49 connecting the portions 47 and 48. Electrodes 21 and 22 are positioned adjacent to, and in electrical contact with portion 47 of strip 42, and a second pair of electrodes 50 and 51 is positioned adjacent to and in electrical contact with portion 48. If the head 40 is formed using conventional thin-film techniques, the connecting portion 49 may be a via formed using conventional techniques.

The operation of read/write head 40 (FIG. 2A) is similar to that of head 10 (FIG. 1), with the addition that, during a read operation, the flux permeating both pole pieces 11 and 12 will affect the resistance of strip 42, whereas with head 10 the resistance of strip 20 is affected primarily by the flux permeating the pole piece 11 adjacent the strip 20. Accordingly, the signal sensed by the sensing equipment (not shown) connected to electrodes 21, 22, 51 and 52 adjacent both pole pieces 11 and 12 of head 40 (FIG. 2A) would be more symmetric than would be the signal sensed by sensing equipment connected to electrodes 21 and 22 adjacent only one pole piece 11 of head 10 (FIG. 1A). A symmetric read signal is more readily processed by other circuitry (not shown) with which the head is used than is an asymmetric read signal.

Furthermore, with the strip 42 (FIG. 3) effectively long in the shape of a horseshoe magnet, the strip is more resistant to formation of multiple magnetic domains by externally applied magnetic flux which is present, in particular, during writing operations.

It will be appreciated by those skilled in the art that additional slots may be formed in the pole pieces to accommodate additional portions of a magneto-resistive strip. In such heads, a single magneto-resistive strip will be positioned, in a serpentine configuration, adjacent all of said slots. The longer magneto-resistive strip 20 will serve to further minimize the Barkhausen noise, and will also serve to increase the sensitivity of the head to the flux read from the disk.

It will also be appreciated that the particular placement of the magneto-resistive strips depicted in the Figures, that is, generally beneath the respective pole pieces 11 and 12, is by way of example and not of limitation. In particular, during some thin film manufacturing processes, it is desirable to form the magneto-resistive strips prior to formation of the adjacent pole pieces to ensure that the magneto-resistive strips are formed on a relatively planar surface. The particular side of the respective pole pieces on which the magneto-resistive strips are formed does not effect the operation of the respective heads 10 and 40.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention,

What is claimed as new and desired to be secured by Letters Patent of the U.S. is:

1. A read/write head for use in a magnetic storage device in a digital data processing system for writing data in the form of magnetic flux onto, and reading data from, a magnetic media which moves relative to the head, the head having two magnetic pole pieces each with a yoke region which tapers to a pole tip, an energizable coil situated between the pole pieces in the yoke region for generating magnetic flux, one of the pole pieces having a slot in the yoke region, the head further including a strip of magneto-resistive material adjacent and oriented transverse to magnetic flux traversing the slot, adapted to be connected to sensing equipment such that as the media is moved relative to the head the resistance of the magneto-resistive strip varies in response to the variations in the magnetic flux recorded onto the media, the sensing equipment sensing the variations in the resistance of the magneto-resistive strip, an electrically insulating layer separating the magneto-resistive strip from the slotted pole piece.

2. A head as defined in claim 1 further comprising means connected to said coil for supplying a varying current to energize said coil during a write operation and a constant current to energize said coil during a read operation, the energization of said coil during a read operation being sufficient to provide a bias magnetization to said magneto-resistive strip to a substantially linear magnetic flux-electrical resistance region.

3. A head as defined inn claim 1 wherein said magneto-resistive strip is formed to have a single magnetic domain defined by magnetic dipoles having a selected orientation with respect to the strip's longitudinal axis, said head further comprising second energizable coil means proximate said magneto-resistive strip and oriented so as to generate a magnetic field coaxial with said strip's longitudinal axis adapted to be energized at the end of a writing operation to force the magnetic dipoles into the selected orientation.

4. A head as defined in claim 1 wherein both pole pieces have slots formed in their respective yoke regions, the slots being generally parallel to each other, the magneto-resistive strip comprising a U-shaped member having straight portions adjacent and oriented transverse to magnetic flux traversing the respective slots.

5. A head as defined in claim 1 wherein the pole piece without the slot further includes a side shield extending from the pole tip thereof around the side of the pole tip of the other pole piece, so that when the head is being used the side shield operates to shield the pole tip of the other pole piece from fringing flux from adjacent tracks.

6. A read/write head for use in a magnetic storage device in a digital data processing system for writing data in the form of magnetic onto, and reading data from, a magnetic media which moves relative to the head, the head comprising:
  A. two magnetic pole pieces each with a yoke region which tapers to a pole tip, one of said pieces having a slot in the yokie region formed substantially parallel to the plane of the media during operation;
  B. an energizable coil situated between the pole pieces in the yoke region for generating magnetic flux;
  C. a strip of magneto-resistive material formed to have a single magnetic domain defined by magnetic dipoles having a selected orientation with respect to the strip's longitudinal axis, the magneto-resistive strip being adjacent and oriented transverse to magnetic flux traversing the slot, and adapted to be connected to sensing equipment such that as the media is moved relative to the head the resistance of the magneto-resistive strip varies in response to the variations in the magnetic flux recorded onto the media, the sensing equipment sensing the variations in the resistance of the magneto-resistive strip, an electrically insulating layer separating the magneto-resistive strip from the slotted pole piece; and
  D. second energizable coil means proximate said magneto-resistive strip and oriented so as to generate a magnetic field coaxial with said strip's longitudinal axis adapted to be energized at the end of a writing operation to force the magnetic dipoles in the selected orientation.

7. A head as defined in claim 6 further comprising means connected to said yoke region coil for supplying a varying current to energize said yoke region coil during a write operation and a constant current to energize said yoke region coil during a read operation, the energization of said yoke region coil during a read operation being sufficient to provide a bias magnetization to said magneto-resistive strip to a substantially linear magnetic flux-electrical resistance region.

8. A head as defined in claim 6 wherein both pole pieces have slots formed in their respective yoke regions, the slots being generally parallel to each other, the magneto-resistive strip comprising a U-shaped member having straight portions adjacent and oriented generally orthogonally to the intended path of magnetic flux traversing the respective slots.

9. A head as defined in claim 6 wherein the pole piece without the slot further includes a side shield extending from the pole tip thereof around the side of the pole tip of the other pole piece, so that when the head is being used the side shield operates to shield the pole tip of the other pole piece from fringing flux from adjacent tracks.

10. A read/write head for use in a magnetic storage device in a digital data processing system for writing data in the form of magnetic flux onto, and reading data from, a magnetic media which moves relative to the head, the head having two magnetic pole pieces each with a yoke region which tapers to a pole tip, an energizable coil situated between the pole pieces in the yoke region for generating magnetic flux, the pole pieces separated by a distance which is relatively large in the yoke region to accommodate the energizable coil and relatively small in the pole piece region to increase the data density on the magnetic medium, one of the pole pieces having a slot in the yoke region which has walls making an acute angle relative to the exterior surface of the yoke, the head further including a strip of magneto-resistive material adjacent and oriented generally orthogonally to the intended path of magnetic flux traversing the slot, adapted to be connected to sensing equipment such that, as the media is moved relative to the head, the resistance of the magneto-resistive strip varies in response to the variations in the magnetic flux recorded onto the media, the sensing equipment sensing the variations in the resistance of the magneto-resistive strip, an electrically insulating layer separating the magneto-resistive strip from the slotted pole piece.

11. A head as defined in claim 10 where said energizable coil has multiple turns, and is planar and helical.

12. A head as defined in claim 10 wherein said strip of magneto-resistive material extends beyond said yoke region.

13. A read/write head as in claim 6 wherein said strip of magneto-restive material is electrically insulated from said pole piece by a thin non-magnetic insulator.

14. A read/write head as in claim 6 wherein said sensing equipment is connected to the head by electrodes attached to said magneto-resistive strip adjacent to said yoke edges.

15. A read/write head for use in a magnetic storage device in a digital data processing system for writing data in the form of magnetic flux onto, and reading data from, a magnetic media which moves relative to the head, the head having two magnetic pole pieces each with a yoke region which tapers to a pole tip, an energizable coil situated between the pole pieces in the yoke region for generating magnetic flux, one of the pole pieces having a slot in the yoke region, the head further including a strip of magneto-resistive material adjacent and oriented generally transverse to the intended path of magnetic flux traversing the slot, adapted to be connected to sensing equipment such that as the media is moved relative to the head the resistance of the magneto-resistive strip varies in response to the variations in the magnetic flux recorded onto the media, the sensing equipment sensing the variations in the resistance of the magneto-resistive strip, wherein both pole pieces have slots formed in their respective yoke regions, the slots being generally parallel to each other, the magneto-resistive strip comprising a U-shaped member having straight portions adjacent and oriented transverse to the intended path of magnetic flux traversing the respective slots.

16. A read/write head for use in a magnetic storage device in a digital data processing system for writing data in the form of magnetic flux onto, and reading data from, a magnetic media which moves relative to the head, the head having two magnetic pole pieces each with a yoke region which tapers to a pole tip, an energizable coil situated between the pole pieces in the yoke region for generating magnetic flux, one of the pole pieces having a slot in the yoke region, the head further including a strip of magneto-resistive material adjacent and oriented transverse to the intended path of magnetic flux traversing the slot, adapted to be connected to sensing equipment such that as the media is moved relative to the head the resistance of the magneto-resistive strip varies in response to the variations in the magnetic flux recorded onto the media, the sensing equipment sensing the variations in the resistance of the magneto-resistive strip, wherein the pole piece without the slot further includes a side shield extending from the pole tip thereof around the side of the pole tip of the other pole piece, so that when the head is being used the side shield operates to shield the pole tip of the other pole piece from fringing flux from adjacent tracks.

17. A read/write head for use in a magnetic storage device in a digital data processing system for writing data in the form of magnetic flux onto, and reading data from, a magnetic media which moves relative to the head, the head comprising:
  A. two magnetic pole pieces each with a yoke region which tapers to a pole tip, both of said pole pieces having a slot in the yoke region formed substantially parallel to the plane of the media during operation, the slots being generally parallel to each other, the magneto-resistive strip comprising a U-shaped member having straight portions adjacent and oriented orthogonally to the intended path of magnetic flux traversing the respective slots;
  B. an energizable coil situated between the pole pieces in the yoke region for generating magnetic flux;
  C. a strip of magneto-resistive material formed to have a single domain defined by magnetic dipoles having a selected orientation with respect to the strip's longitudinal axis, the magneto-resistive strip being adjacent and generally oriented transverse to the intended path of magnetic flux traversing the slots, and adapted to be connected to sensing equipment such that as the media is moved relative to the head the resistance of the magneto-resistive strip varies in response to the variations in the magnetic flux recorded onto the media, the sensing equipment sensing the variations in the resistance of the magneto-resistive strip; and
  D. second energizable coil means proximate said magneto-resistive strip and oriented so as to generate a magnetic field coaxial with said strip's longitudinal axis adapted to be energized at the end of a writing operation to force the magnetic dipoles in the selected orientation.

18. A read/write head for use in a magnetic storage device in a digital data processing system for writing data in the form of magnetic flux onto, said reading data from, a magnetic media which moves relative to the head, the head comprising:
  A. two magnetic pole pieces each with a yoke region which tapers to a pole tip, one of said pole pieces having a slot in the yoke region formed substantially parallel to the plane of the media during operation;

B. an energizable coil situated between the pole pieces in the yoke region for generating magnetic flux;

C. a strip of magneto-resistive material formed to have a single domain defined by magnetic dipoles having a selected orientation with respect to the strip's longitudinal axis, the magneto-resistive strip being adjacent and generally oriented transverse to the intended path of magnetic flux traversing the slot, and adapted to be connected to sensing equipment such that as the media is moved relative to the head the resistance of the magneto-resistive strip varies in response to the variations in the magnetic flux recorded onto the media, the sensing equipment sensing the variations in the resistance of the magneto-resistive strip;

D. second energizable coil means proximate said magneto-resistive strip and oriented so as to generate a magnetic field coaxial with said strip's longitudinal axis adapted to be energized at the end of a writing operation to force the magnetic dipoles in the selected orientation; and E. the pole piece without the slot further including a side shield extending from the pole tip thereof around the side of the pole tip of the other pole piece, so that when the head is being used the side shield operates to shield the pole tip of the other pole piece from finding flux from adjacent tracks.

19. A device for reading flux from magnetically stored data comprising a magnetic head having a yoke region tapering to a tip region, at least two structures extending from the yoke region to the tip region defining a gap between the structures, the gap at the tip region being narrower than the gap toward the yoke region, at least one of the structures configured as a slotted read pole, and slot removed from the tip region toward the yoke region, and a magneto-resistive element coupled to the slotted pole adjacent to the slot via an insulator, whereby, in use, flux from the stored data is sensed through the magneto-resistive element as the flux travels from the read pole tip region to the read pole yoke region past the slot.

* * * * *

UNITED STATES PATENT AND TRADEMARK OFFICE
CERTIFICATE OF CORRECTION

PATENT NO. : 4,885,649

DATED : December 5, 1989

INVENTOR(S) : Shyam C. Das

It is certified that error appears in the above-identified patent and that said Letters Patent is hereby corrected as shown below:

On the title page
<u>In the title</u>:

Change "MAGNETO-RESTRICTIVE" to --MAGNETO-RESISTIVE--.

Signed and Sealed this

Twelfth Day of May, 1992

Attest:

DOUGLAS B. COMER

*Attesting Officer*   Acting Commissioner of Patents and Trademarks